(12) United States Patent
Amikura et al.

(10) Patent No.: US 10,031,007 B2
(45) Date of Patent: Jul. 24, 2018

(54) METHOD OF CALCULATING OUTPUT FLOW RATE OF FLOW RATE CONTROLLER

(71) Applicant: Tokyo Electron Limited, Tokyo (JP)

(72) Inventors: Norihiko Amikura, Miyagi (JP); Risako Miyoshi, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 24 days.

(21) Appl. No.: 15/262,120

(22) Filed: Sep. 12, 2016

(65) Prior Publication Data
US 2017/0074694 A1    Mar. 16, 2017

(30) Foreign Application Priority Data

Sep. 16, 2015  (JP) .................................. 2015-183079
Jan. 21, 2016  (JP) .................................. 2016-009848

(51) Int. Cl.
*G01F 1/42*  (2006.01)
(52) U.S. Cl.
CPC ...................................... *G01F 1/42* (2013.01)
(58) Field of Classification Search
CPC ............. G01F 1/42; H01L 21/67; F16L 41/02

USPC ...................................................... 73/861.61
See application file for complete search history.

(56) References Cited

U.S. PATENT DOCUMENTS

2017/0032982 A1*  2/2017  Drewery ........... H01L 21/67017

FOREIGN PATENT DOCUMENTS

JP              5286430 B      6/2013

\* cited by examiner

*Primary Examiner* — Jewel V Dowtin
(74) *Attorney, Agent, or Firm* — Pearne & Gordon LLP

(57) ABSTRACT

A gas, whose flow rate is adjusted by a flow rate controller as a measurement target, is supplied into a processing vessel in a state that a third valve of the gas supply system provided at an upstream side of the processing vessel is opened. While the gas is continuously supplied, the third valve is closed after a pressure measurement value of a pressure gauge within a flow rate controller for pressure measurement is stabilized. After the third valve is closed, an output flow rate of the flow rate controller as the measurement target is calculated from a previously known volume of the gas supply system in which the gas supplied through the flow rate controller as the measurement target is collected and a rise rate of the pressure measurement value of the pressure gauge within the flow rate controller for pressure measurement with respect to time.

4 Claims, 7 Drawing Sheets

METHOD OF CALCULATING OUTPUT FLOW RATE OF FLOW RATE CONTROLLER

CROSS-REFERENCE TO RELATED APPLICATION

This application claims the benefit of Japanese Patent Application Nos. 2015-183079 and 2016-009848 filed on Sep. 16, 2015 and Jan. 21, 2016, respectively, the entire disclosures of which are incorporated herein by reference.

TECHNICAL FIELD

The embodiments described herein pertain generally to a method of calculating an output flow rate of a flow rate controller.

BACKGROUND

In the manufacture of an electronic device such as a semiconductor device, a substrate processing apparatus is used. A gas for processing a substrate is supplied into a processing vessel of the substrate processing apparatus from a gas supply system. In general, the gas supply system is configured to supply one or more gases selected from multiple kinds of gases into the processing vessel of the substrate processing apparatus. Further, the gas supply system is equipped with multiple flow rate controllers for controlling flow rates of the multiple kinds of gases individually.

As such a flow rate controller, there is known a pressure type flow rate controller. The flow rate controller of this type is operated to reduce a difference between a set flow rate as a target value and a calculation flow rate calculated from a pressure measurement value of a pressure gauge of the flow rate controller. However, the calculation flow rate of the flow rate controller may have a big error from an actual output flow rate of the flow rate controller as it is used. For this reason, the output flow rate of the flow rate controller needs to be calculated. As a method of calculating the output flow rate of the flow rate controller, there is known a so-called build-up method. The build-up method is described in Patent Document 1.

In the build-up method, a gas is supplied into the processing vessel of the substrate processing apparatus via a flow rate controller as a measurement target, and an output flow rate of the flow rate controller as the measurement target is calculated from an internal pressure of the processing vessel, an internal temperature of the processing vessel and a previously known internal volume of the processing vessel.

Patent Document 1: Japanese Patent No. 5,286,430

Since, however, the internal volume of the processing vessel is very large, the conventional build-up method includes an error factor. For example, the conventional build-up method is affected by a temperature difference within the processing vessel and/or a change of the processing vessel with the lapse of time. Though it may be considered to use a method of calculating the output flow rate of the flow rate controller with a flow rate measuring device provided within the gas supply system without using the processing vessel, such a method causes a cost increase of the gas supply system.

Thus, it is required to calculate the output flow rate of the flow rate controller by using the components previously provided in the gas supply system.

SUMMARY

In one exemplary embodiment, there is provided a method of calculating an output flow rate of a flow rate controller of a gas supply system configured to supply a gas into a processing vessel of a substrate processing apparatus. Here, the gas supply system includes multiple first lines, multiple first valves, multiple flow rate controllers, multiple second lines, multiple second valves, a third line and a third valve. The first lines are respectively connected to multiple gas sources. The first valves are respectively provided at the first lines. The flow rate controllers are pressure type flow rate controllers, and respectively provided at downstream sides of the first lines. The second lines are respectively provided at downstream sides of the flow rate controllers. The second valves are respectively provided at the second lines. The third line is provided at downstream sides of the second lines. The third valve is provided at the third line. Further, the method includes (a) a first process of beginning a supply of a gas, whose flow rate is adjusted by a flow rate controller as a measurement target among the flow rate controllers, into the processing vessel in a state that the third valve is opened; (b) a second process of closing, while continuing the supply of the gas into the processing vessel, the third valve after a pressure measurement value of a pressure gauge within a flow rate controller for pressure measurement among the flow rate controllers is stabilized; and (c) a third process of calculating, after the third valve is closed in the second process, the output flow rate of the flow rate controller as the measurement target from a previously known volume of the gas supply system in which the gas supplied through the flow rate controller as the measurement target is collected and a rise rate of the pressure measurement value of the pressure gauge within the flow rate controller for pressure measurement with respect to time.

In the method according to the present exemplary embodiment, the one flow rate controller among the multiple flow rate controllers previously provided in the gas supply system serves as the flow rate controller for pressure measurement, and the output flow rate of the flow rate controller is calculated from the previously known volume within the gas supply system and the rise rate of the pressure measurement value of the flow rate controller for pressure measurement with respect to time. Thus, according to this method, it is possible to calculate the output flow rate of the flow rate controller by using the components previously provided in the gas supply system.

The flow rate controller as the measurement target and the flow rate controller for pressure measurement may be one of the flow rate controllers. Further, the one of the flow rate controllers includes an orifice, a control valve provided at an upstream side of the orifice, a first pressure gauge configured to measure a pressure of a gas line between the control valve and the orifice, and a second pressure gauge provided at a downstream side of the orifice. In the first process, only a first valve, among the first valves, provided at an upstream side of the one of the flow rate controllers is opened, and only a second valve, among the second valves, provided at a downstream side of the one of the flow rate controllers is opened. In the second process, the third valve is closed after a pressure measurement value of the second pressure gauge of the one of the flow rate controllers is stabilized. In the third process, a rise rate of the pressure measurement value of the second pressure gauge with respect to time is used as the rise rate of the pressure measurement value of the pressure gauge within the flow rate controller for pressure measurement with respect to time.

The flow rate controller as the measurement target may be a first flow rate controller among the flow rate controllers, and the flow rate controller for pressure measurement may be a second flow rate controller, which is different from the first flow rate controller, among the flow rate controllers. Here, each of the first flow rate controller and the second flow rate controller includes an orifice, a control valve provided at an upstream side of the orifice and a pressure gauge configured to measure a pressure of a gas line between the control valve and the orifice. In the first process, only a first valve, among the first valves, provided at an upstream side of the first flow rate controller is opened, and, among the second valves, only a second valve provided at a downstream side of the first flow rate controller and only a second valve provided at a downstream side of the second flow rate controller are opened. Moreover, the method further includes (d) an acquiring process of acquiring, after the first process and before the second process, as a first pressure measurement value, a pressure measurement value of the pressure gauge of the second flow rate controller at a moment when the pressure measurement value is stabilized in a state that the supply of the gas into the processing vessel is continued; and (e) a closing process of closing the second valve provided at the downstream side of the first flow rate controller after the second process and before the third process and upon a lapse of a preset time from a time point when the first pressure measurement value is acquired. In the second process, the third valve is closed immediately after the first pressure measurement value is acquired. In the third process, the rise rate of the pressure measurement value with respect to time is obtained by dividing a difference between the first pressure measurement value and a second pressure measurement value, which is a pressure measurement value of the pressure gauge of the second flow rate controller at a moment when the pressure measurement value is stabilized, by the preset time.

In accordance with another exemplary embodiment, there is provided a method of calculating an output flow rate of a flow rate controller of a gas supply system configured to supply a gas into a processing vessel of a substrate processing apparatus. Here, the gas supply system includes multiple first lines, multiple first valves, multiple flow rate controllers, multiple second lines, multiple second valves, a third line and a third valve. The first lines are respectively connected to multiple gas sources. The first valves are respectively provided at the first lines. The flow rate controllers are pressure type flow rate controllers, and respectively provided at downstream sides of the first lines. The second lines are respectively provided at downstream sides of the flow rate controllers. The second valves are respectively provided at the second lines. The third line is provided at downstream sides of the second lines. The third valve is provided at the third line. One of the flow rate controllers includes an orifice, a control valve provided at an upstream side of the orifice, a first pressure gauge configured to measure a pressure of a gas line between the control valve and the orifice, and a second pressure gauge provided at a downstream side of the orifice. Further, the method includes (a) a first process of beginning a supply of a gas, whose flow rate is adjusted by the one of the flow rate controllers, into the processing vessel in a state that a first valve, among the first valves, provided at an upstream side of the one of the flow rate controllers, a second valve, among the second valves, provided at a downstream side of the one of the flow rate controllers and the third valve are opened; (b) a second process of closing, while continuing the supply of the gas into the processing vessel, the second valve provided at the downstream side of the one of the flow rate controllers after a pressure measurement value of the second pressure gauge within the one of the flow rate controllers is stabilized; and (c) a third process of calculating, after the second valve provided at the downstream side of the one of the flow rate controllers is closed in the second process, the output flow rate of the one of the flow rate controllers from a previously known volume of the gas supply system in which the gas supplied through the one of the flow rate controllers is collected and a rise rate of the pressure measurement value of the second pressure gauge of the one of the flow rate controllers with respect to time. In this method, the output flow rate of the one of the flow rate controllers is calculated by using the previously known volume of the flow paths at the upstream side of the second valve provided at the downstream side of the one of the flow rate controllers.

According to the exemplary embodiments as described above, it is possible to calculate the output flow rate of the flow rate controller by using the components previously provided in the gas supply system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
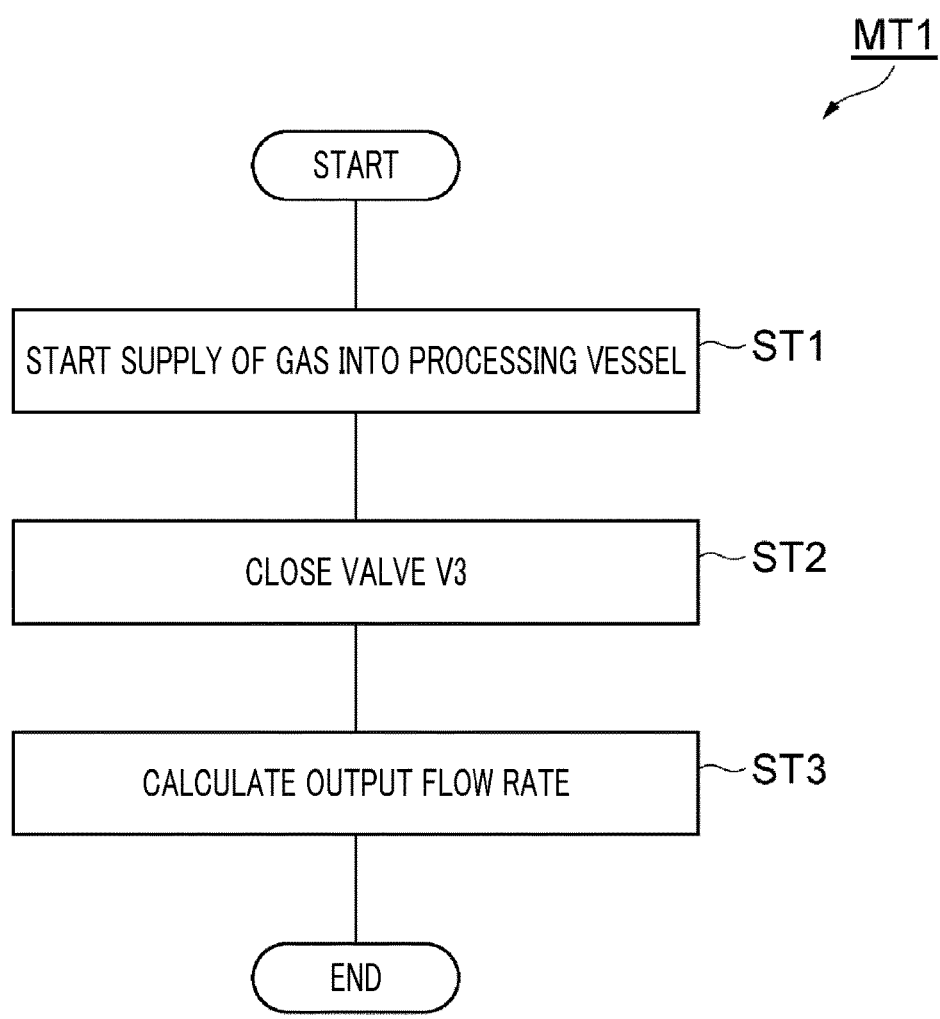
FIG. 1 is a flowchart for describing a method of calculating an output flow rate of a flow rate controller of a gas supply system configured to supply a gas into a processing vessel of a substrate processing apparatus according to an exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 is a flowchart for describing a method of calculating an output flow rate of a flow rate controller of a gas supply system configured to supply a gas into a processing vessel of a substrate processing apparatus according to an exemplary embodiment. The method MT1 shown in FIG. 1 is applicable to a gas supply system shown in FIG. 2, for example.

Figure 2:
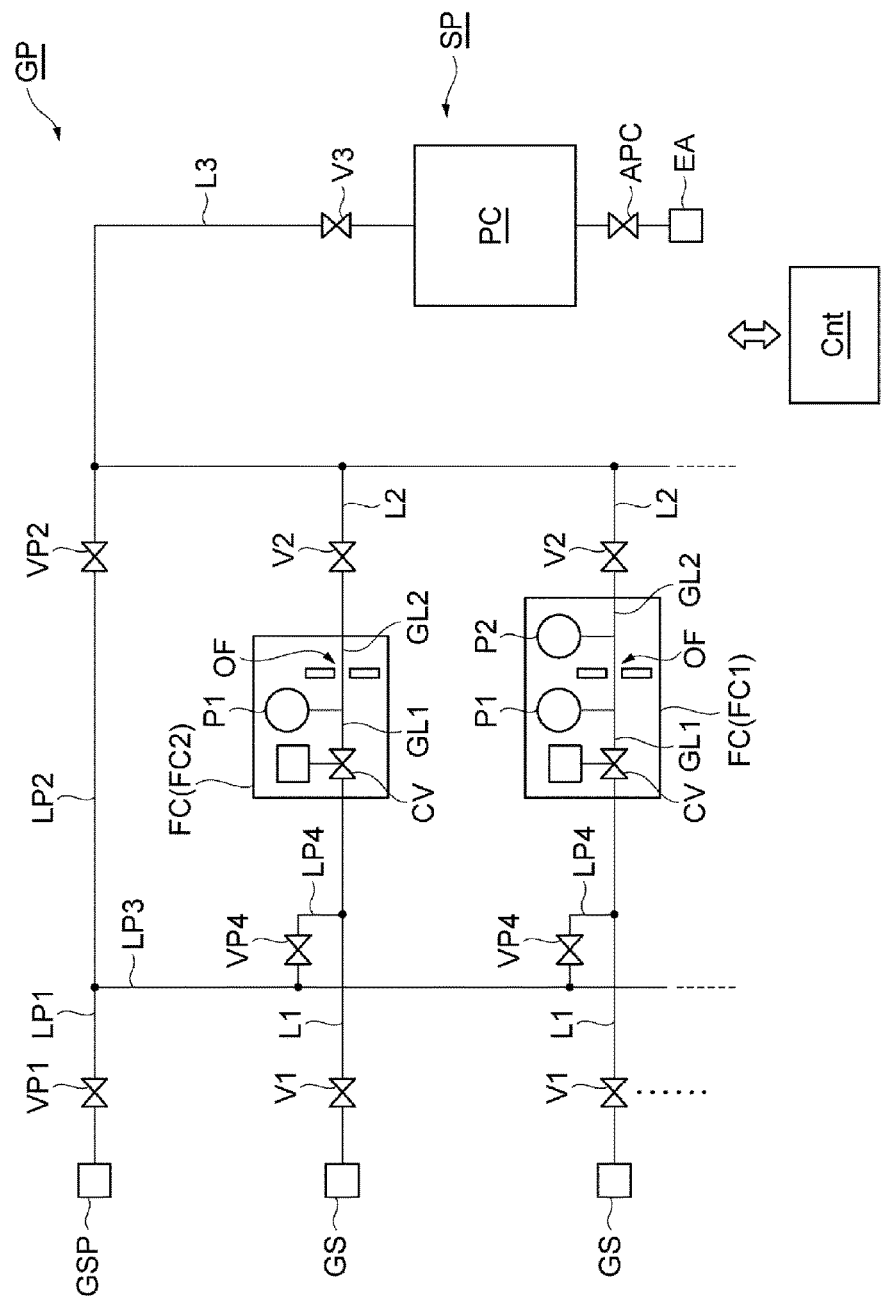
FIG. 2 is a diagram illustrating an example of the gas supply system.

The gas supply system GP shown in FIG. 2 includes a multiple number of first lines L1, a multiple number of first valves V1, a multiple number of flow rate controllers FC, a multiple number of second lines L2, a multiple number of second valves V2, a third line L3 and a third valve V3.

One ends of the multiple number of first lines L1 are respectively connected to a multiple number of gas sources GS. The gas sources GS are sources of gases for processing a substrate in a substrate processing apparatus SP. The first lines L1 are respectively equipped with the first valves V1.

The flow rate controllers FC are respectively provided at a downstream side of the first lines L1 and the first valves V1. The flow rate controllers FC are respectively connected to the other ends of the first lines L1 at downstream sides thereof. The second lines L2 are respectively provided at downstream sides of the flow rate controllers FC. One ends of the second lines L2 are respectively connected to the flow rate controllers FC. The second lines L2 are respectively equipped with the second valves V2.

The third line L3 is provided at downstream sides of the second lines L2 and the second valves V2. The other ends of the second lines L2 are connected to one end of the third line L3. The third line L3 is equipped with the third valve V3. The other end of the third line L3, i.e., the end of the third line L3 at a downstream side of the third valve V3 is connected to a processing vessel PC of the substrate processing apparatus SP. A gas exhaust device EA is provided at the downstream side of the processing vessel PC with a pressure control valve APC therebetween.

Further, the gas supply system GP further includes a line LP1, a valve VP1, a line LP2, a valve VP2, a multiple number of lines LP4 and a multiple number of valves VP4. One end of the line LP1 is connected to a source of a purge gas such as a $N_2$ gas. The line LP1 is equipped with the valve VP1. The other end of the line LP1 is connected to the line LP2 and a line LP3 at a downstream side of the valve VP1. One end of the line LP2 is connected to the line LP1 at the downstream side of the valve VP1, and the other end of the line LP2 is connected to the third line L3. The line LP2 is equipped with the valve VP2.

One end of the line LP3 is connected to the line LP1 at the downstream side of the valve VP1. One ends of the multiple number of lines LP4 are connected to the line LP3. The other ends of the lines LP4 are respectively connected to the first lines L1 at the downstream side of the first valves V1. These lines LP4 are respectively equipped with the valves VP4.

Each of the multiple number of flow rate controllers FC is a pressure type flow rate controller. Each flow rate controller FC is equipped with a control valve CV, an orifice OF and a pressure gauge P1. Further, each flow rate controller FC is provided with a gas line GL1 at an upstream side of the orifice OF and a gas line GL2 at a downstream side of the orifice OF. The gas line GL1 is connected to the corresponding first line L1, and the gas line GL2 is connected to the corresponding second line L2.

The control valve CV is provided on the gas line GL1 at the upstream side of the orifice OF. The pressure gauge P1 configured to measure the pressure of the gas line GL1 is connected to the gas line GL1 between the control valve CV and the orifice OF.

In the present exemplary embodiment, the multiple number of flow rate controllers FC include a flow rate controller FC1 and a flow rate controller FC2. The flow rate controller FC1 further includes a pressure gauge P2. Meanwhile, among the flow rate controllers, the flow rate controller FC2 does not have the pressure gauge P2. The pressure gauge P2 is connected to the gas line GL2 to measure a pressure of the gas line GL2.

The flow rate controller FC2 is configured to control a flow rate of a gas flowing in the flow rate controller FC2 under the condition that the pressure of the gas line GL1 is equal to or higher than twice the pressure of the gas line GL2. To elaborate, the flow rate controller FC2 controls the control valve CV to reduce a difference between a set flow rate and a calculation flow rate calculated from a pressure measurement value of the pressure gauge P1. Further, the set flow rate is set by, for example, a control unit Cnt to be described later.

The flow rate controller FC1 is configured to control the control valve CV in the same way as the flow rate controller FC2 under the condition that the pressure of the gas line GL1 is equal to or higher than twice the pressure of the gas line GL2. Meanwhile, under the condition that the pressure of the gas line GL1 is lower than twice the pressure of the gas line GL2, the flow rate controller FC1 controls the control valve CV to reduce a difference between the set flow rate and a calculation flow rate calculated from a pressure difference between the pressure measurement value of the pressure gauge P1 and a pressure measurement value of the pressure gauge P2.

Furthermore, as shown in FIG. 2, the gas supply system GP may further include the control unit Cnt. The control unit Cnt also serves as a controller of the substrate processing apparatus SP and is implemented by, for example, a computer. The control unit Cnt controls the individual components of the substrate processing apparatus SP and the individual components of the gas supply system GP according to a recipe stored in a storage device for processing the substrate in the substrate processing apparatus SP. Further, the control unit Cnt controls the valves of the gas supply system GP in various exemplary embodiments regarding a method of calculating the output flow rate of the flow rate controller. In addition, in the various exemplary embodiments regarding this method, the control unit Cnt receives the pressure measurement value of the pressure gauge P1 or the pressure measurement value of the pressure gauge P2 and calculates the output flow rate of the flow rate controller.

Now, reference is made back to FIG. 1. As shown in FIG. 1, in the method MT1, the output flow rate of the flow rate controller FC1 is calculated by using a pressure measurement value of the pressure gauge P2 of the flow rate controller FC1. That is, in the method MT1, the single flow rate controller FC1 is a flow rate controller as a measurement target and for pressure measurement. The method MT1 is begun in a process ST1.

In the process ST1, a gas having a flow rate adjusted by the flow rate controller FC1 is started to be supplied into the processing vessel PC. In this process ST1, the first valve V1 at the upstream side of the flow rate controller FC1 and the second valve V2 at the downstream side of the flow rate controller FC1 are opened, and the other first valves V1, the other second valves V2, the valve VP1, the valve VP2 and the valves VP4 are closed. Further, in the process ST1, the third valve V3 is opened. Accordingly, the gas from the gas source GS provided at the upstream side of the flow rate controller FC1 is supplied into the processing vessel PC via the first line L1, the flow rate controller FC1, the second line L2 and the third line L3. In this process ST1, the gas exhaust device EA is operated, and the pressure control valve APC is opened. Further, in the process ST1, the control over the valves of the gas supply system GP, the flow rate controller FC1, the pressure control valve APC, and so forth may be performed by the control unit Cnt.

In a subsequent process ST2, while continuing the supply of the gas into the processing vessel PC, the pressure measurement value of the pressure gauge P2 is monitored. After the pressure measurement value of the pressure gauge P2 is stabilized, the third valve V3 is closed. For example, if a difference between a minimum value and a maximum value of the pressure measurement value of the pressure gauge P2 for a predetermined time period is equal to or less than a preset value, it can be determined that the pressure measurement value of the pressure gauge P2 is stabilized. In this process ST2, the pressure measurement value may be sent to the control unit Cnt, and the monitoring of the pressure measurement value may be performed by the control unit Cnt. Further, the control of the third valve V3 may also be performed by the control unit Cnt.

Figure 3:
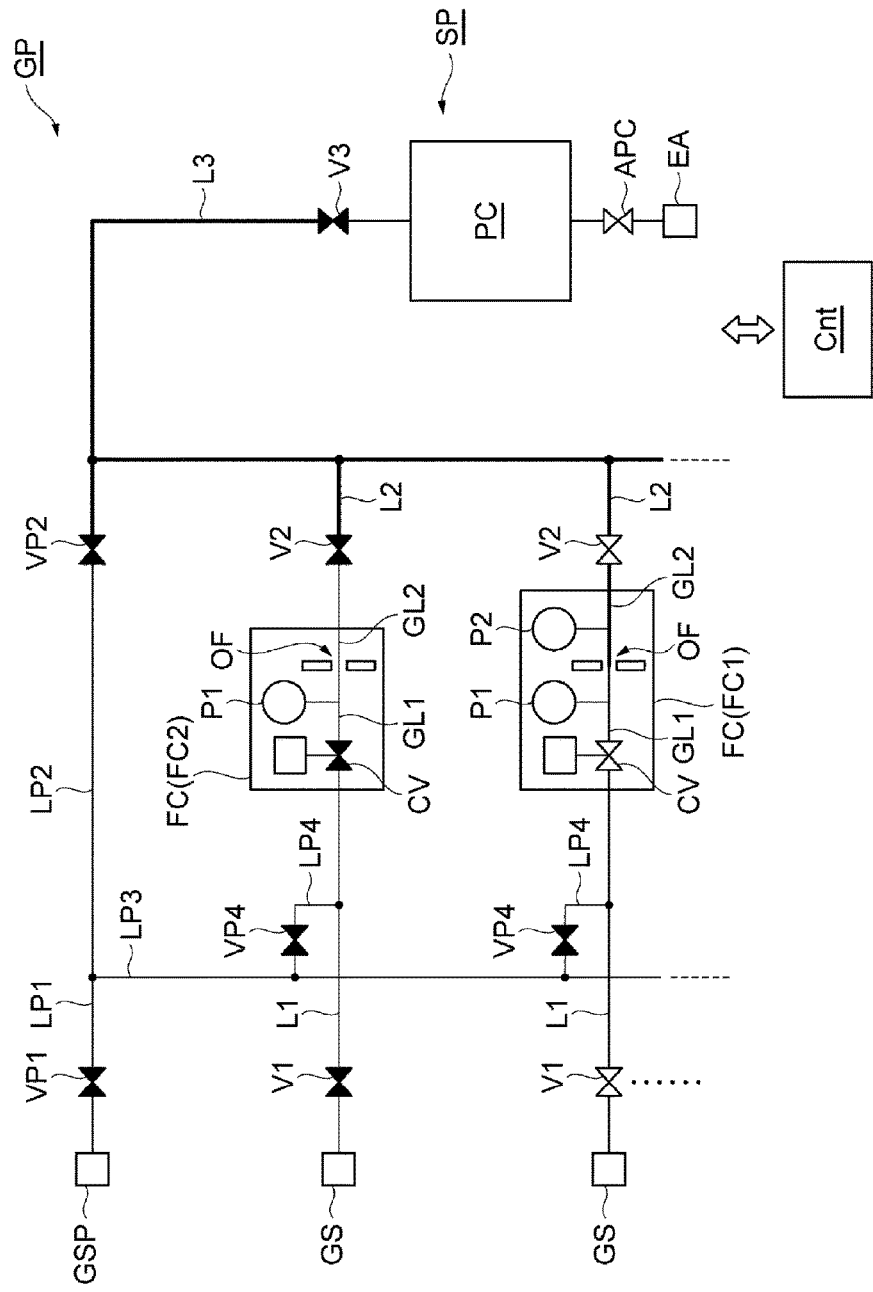
FIG. 3 is a diagram illustrating valve states of the gas supply system after a process ST2 is performed.

In the process ST2, if the third valve V3 is closed, the individual valves of the gas supply system GP are turned into a state as depicted in FIG. 3. In FIG. 3, black colored valves indicate closed valves, and white colored valves indicate opened valves.

After the process ST2 is performed, the gas supplied through the flow rate controller FC1 is collected in flow paths indicated by bold lines in FIG. 3. To be specific, the gas is collected in the gas line GL2 of the flow rate controller FC1, the second line L2 at the downstream side of the corresponding gas line GL2, the third line L3 at the upstream side of the third valve V3, and the second lines L2 at the downstream sides of the flow rate controllers FC other than the flow rate controller FC1 and at the downstream sides of the second valves V2. The volume of the flow paths within the gas supply system GP in which the gas is collected after the process ST2 is previously measured before the method MT1 is performed, and thus, is a known volume Vk.

In a subsequent process ST3, a pressure rise rate (dP/dt) is calculated from the pressure measurement values of the pressure gauge P2 at multiple time points after the process ST2 is performed. By way of example, a gradient of a straight line approximating a relationship between the pressure measurement values and the time points when the pressure measurement values are acquired may be calculated as the pressure rise rate. In the process ST3, the output flow rate Q of the flow rate controller FC1 is calculated by the following Expression (1).

$$Q = (dP/dt) \times Vk \div T \times C \qquad (1)$$

Further, in Expression (1), T denotes a temperature, and may be an actually measured temperature of the aforementioned flow paths in which the gas is collected, or a preset temperature. Further, C denotes a constant and has a value specified by 22.4 liter per R. Here, R is a gas constant.

In the process ST3, the pressure measurement values of the pressure gauge P2 may be sent to the control unit Cnt, and the calculation of the pressure rise rate and the calculation of the output flow rate Q may be performed by the control unit Cnt. Further, in case that all the flow rate controllers FC have the same configuration as that of the flow rate controller FC1, the method MT1 may be performed for all of the flow rate controllers FC in turn.

Figure 4:
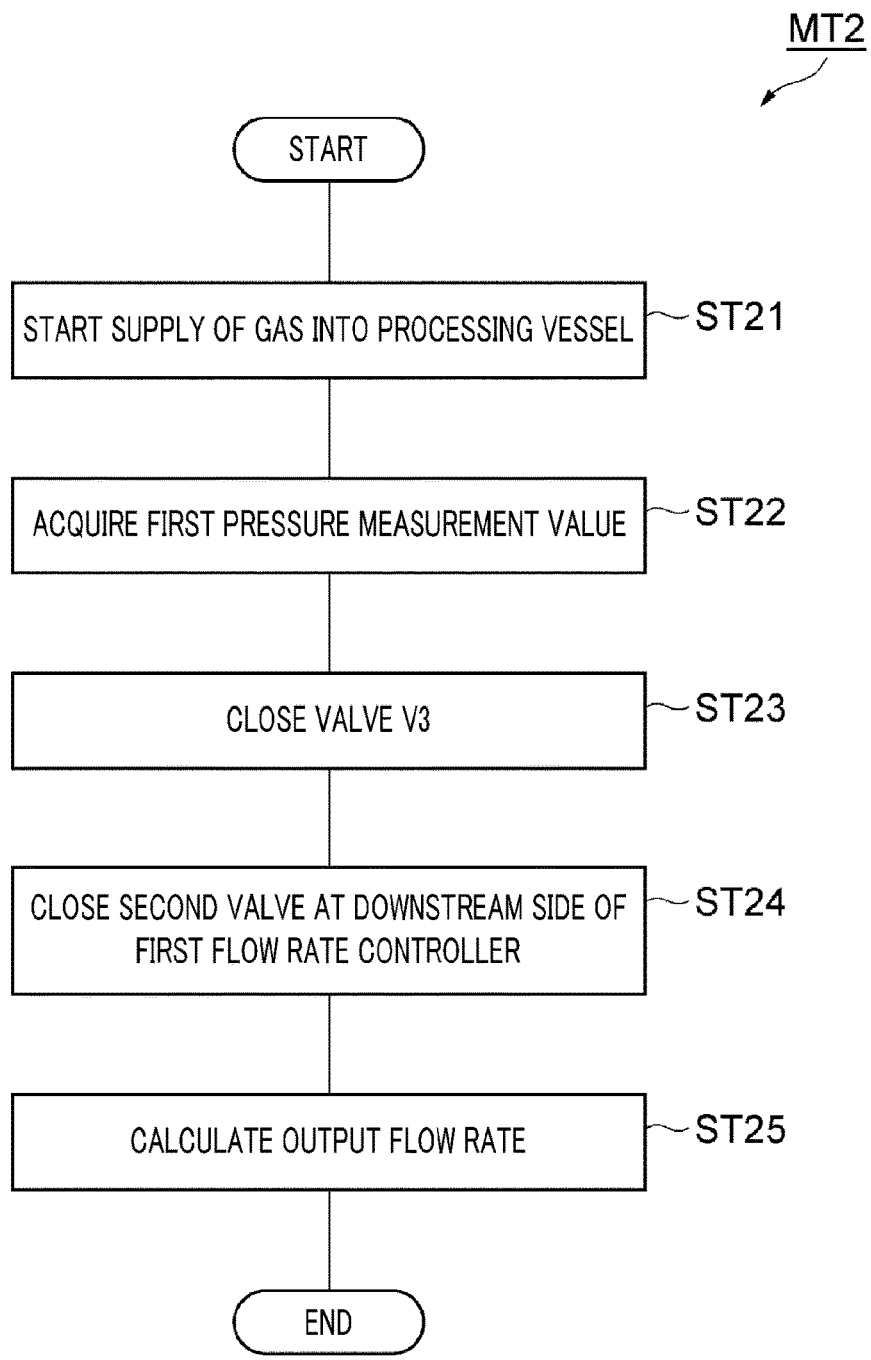
FIG. 4 is a flowchart for describing a method of calculating the output flow rate of the flow rate controller of the gas supply system configured to supply the gas into the processing vessel of the substrate processing apparatus according to another exemplary embodiment.

Now, a method of calculating the output flow rate of the flow rate controller of the gas supply system configured to supply the gas into the processing vessel of the substrate processing apparatus according to another exemplary embodiment will be discussed. FIG. 4 is a flowchart for describing another exemplary embodiment of the method of calculating the output flow rate of the flow rate controller of the gas supply system configured to supply the gas into the processing vessel of the substrate processing apparatus. The method MT2 shown in FIG. 4 is applicable to the gas supply system GP of FIG. 2. In this method MT2, one flow rate controller FC is a flow rate controller as a measurement target, and another flow rate controller FC serves as a flow rate controller for pressure measurement. Each of the flow rate controller as the measurement target and the flow rate controller for pressure measurement may have a structure of either the flow rate controller FC1 or the flow rate controller FC2. In the following, the method MT2 will be described for an example case where the flow rate controller FC1 is the measurement target, and the flow rate controller FC2 is one for pressure measurement.

As depicted in FIG. 4, the method MT2 is begun in a process ST21. In the process ST21, a gas having a flow rate adjusted by the flow rate controller FC1 is started to be supplied into the processing vessel PC. In the process ST21, the first valve V1 at the upstream side of the flow rate controller FC1, the second valve V2 at the downstream side of the flow rate controller FC1 and the second valve V2 at the downstream side of the flow rate controller FC2 are opened, and the other first valves V1, the other second valves V2, the valve VP1, the valve VP2 and the valves VP4 are closed. Further, in the process ST21, the third valve V3 is opened. Accordingly, the gas from the gas source GS provided at the upstream side of the flow rate controller FC1 is supplied into the processing vessel PC via the first line L1, the flow rate controller FC1, the second line L2 and the third line L3. In the process ST21, the gas exhaust device EA is operated, and the pressure control valve APC is opened. Further, the control over the valves of the gas supply system GP, the flow rate controller FC1, the pressure control valve APC, and so forth in the process ST21 may be performed by the control unit Cnt.

In a subsequent process ST22, while continuing the supply of the gas into the processing vessel PC, a pressure measurement value of the pressure gauge P1 of the flow rate controller FC2 is monitored. The pressure measurement value of the pressure gauge P1 of the flow rate controller FC2 at the moment when the pressure measurement value is stabilized is acquired as a pressure measurement value Pm1. Further, in the process ST22, the pressure measurement value of the pressure gauge P1 of the flow rate controller FC2 may be sent to the control unit Cnt, and the monitoring of the pressure measurement value and the acquisition of the pressure measurement value Pm1 may be performed by the control unit Cnt.

In a subsequent process ST23, the third valve V3 is closed immediately after the pressure measurement value Pm1 is acquired in the process ST22. The control of the third valve V3 in this process ST23 may be performed by the control unit Cnt.

Figure 5:
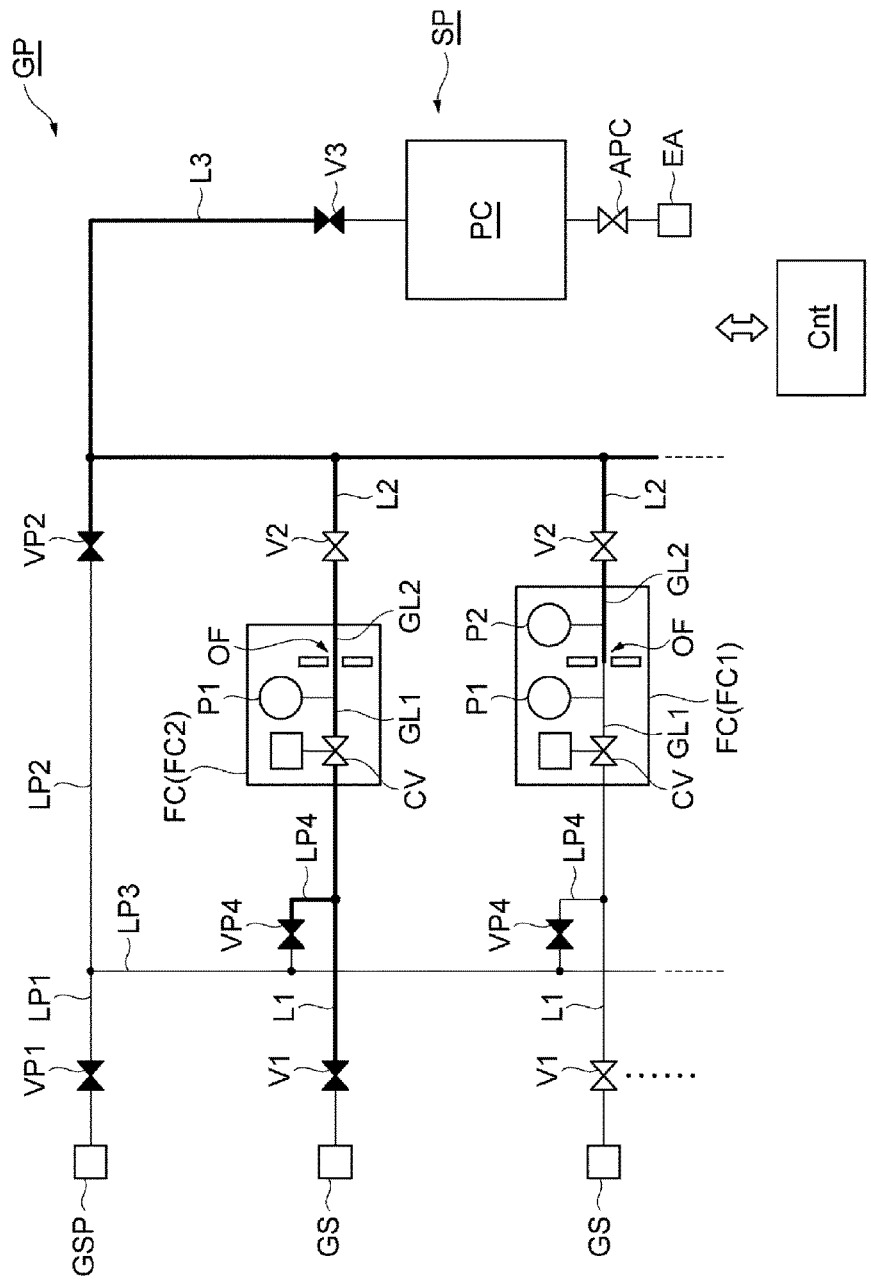
FIG. 5 is a diagram illustrating the valve states of the gas supply system after a process ST23 is performed.

If the third valve V3 is closed in the process ST23, the individual valves of the gas supply system GP are turned into a state illustrated in FIG. 5. In FIG. 5, black colored valves indicate closed valves, and white colored valves indicate opened valves. Further, in the state shown in FIG. 5, the control valve CV of the flow rate controller FC2 is opened.

After the process ST23 is performed, the gas supplied through the flow rate controller FC1 is collected in flow paths indicated by bold lines in FIG. 5. To be specific, the gas is collected in the gas line GL2 of the flow rate controller FC1, the second line L2 at the downstream side of the corresponding gas line GL2, the third line L3 at the upstream side of the third valve V3, the first line L1 at the upstream side of the flow rate controller FC2 and at the downstream side of the corresponding first valve V1, the line LP4 at the upstream side of the flow rate controller FC2 and at the downstream side of the corresponding valve VP4, the gas lines GL1 and GL2 of the flow rate controller FC2, the second line L2 at the downstream side of the flow rate controller FC2, and the second lines L2 at the downstream sides of the flow rate controllers FC other than the flow rate controller FC1 and the flow rate controller FC2 and at the downstream sides of the corresponding second valves V2. The volume of the flow paths within the gas supply system GP in which the gas is collected after the process ST23 is previously measured before the method MT2 is performed, and thus, is a known volume Vk2.

Further, in the state shown in FIG. 5, though the control valve CV of the flow rate controller FC2 is opened, the control valve CV of the flow rate controller FC2 may be closed. In case that the control valve CV of the flow rate controller FC2 is closed, the known volume Vk2 has a value smaller than the volume of the flow paths indicated by the bold lines of FIG. 5 by as much as a volume including the first line L1 at the upstream side of the flow rate controller FC2 and at the downstream side of the corresponding first valve V1 and the line LP4 at the upstream side of the flow rate controller FC2 and at the downstream side of the corresponding valve VP4.

In a subsequent process ST24, the second valve V2 at the downstream side of the flow rate controller FC1 is closed after the process ST23 is performed and, also, after a preset time elapses from the time point when the pressure measurement value Pm1 is acquired. The control of the second valve V2 in this process ST23 may be performed by the control unit Cnt.

In a subsequent process ST25, the pressure measurement value of the pressure gauge P1 of the flow rate controller FC2 is monitored. The pressure measurement value of the pressure gauge P1 of the flow rate controller FC2 at the moment when the pressure measurement value is stabilized is acquired as a pressure measurement value Pmt. Further, if a difference between a minimum value and a maximum value of the pressure measurement value of the pressure gauge P1 of the flow rate controller FC2 for a predetermined time period is equal to or less than a preset value, it can be determined that the pressure measurement value of the pressure gauge P1 of the flow rate controller FC2 is stabilized. Thereafter, in the process ST25, a pressure rise rate (dP/dt) is calculated. The pressure rise rate is calculated by (Pm2−Pm1)/Δt. Here, Δt is a difference between the time point when the pressure measurement value Pm1 is acquired and the time point when the second valve V2 is closed in the process ST24.

In the subsequent process ST25, the output flow rate Q of the flow rate controller FC1 is calculated by the following Expression (2).

$$Q=(dP/dt) \times Vk2 \div T \times C \qquad (2)$$

Further, in Expression (2), T denotes a temperature, and may be an actually measured temperature of the aforementioned flow paths in which the gas is collected, or a preset temperature. Further, C denotes a constant and has a value specified by 22.4 liter per R. Here, R is a gas constant.

In the process ST25, the pressure measurement value of the pressure gauge P1 of the flow rate controller FC2 may be sent to the control unit Cnt, and the monitoring of the pressure measurement value, the calculation of the pressure rise rate and the calculation of the output flow rate Q may be performed by the control unit Cnt. Further, the method MT2 may be performed for all of the flow rate controllers FC in turn.

Figure 6:
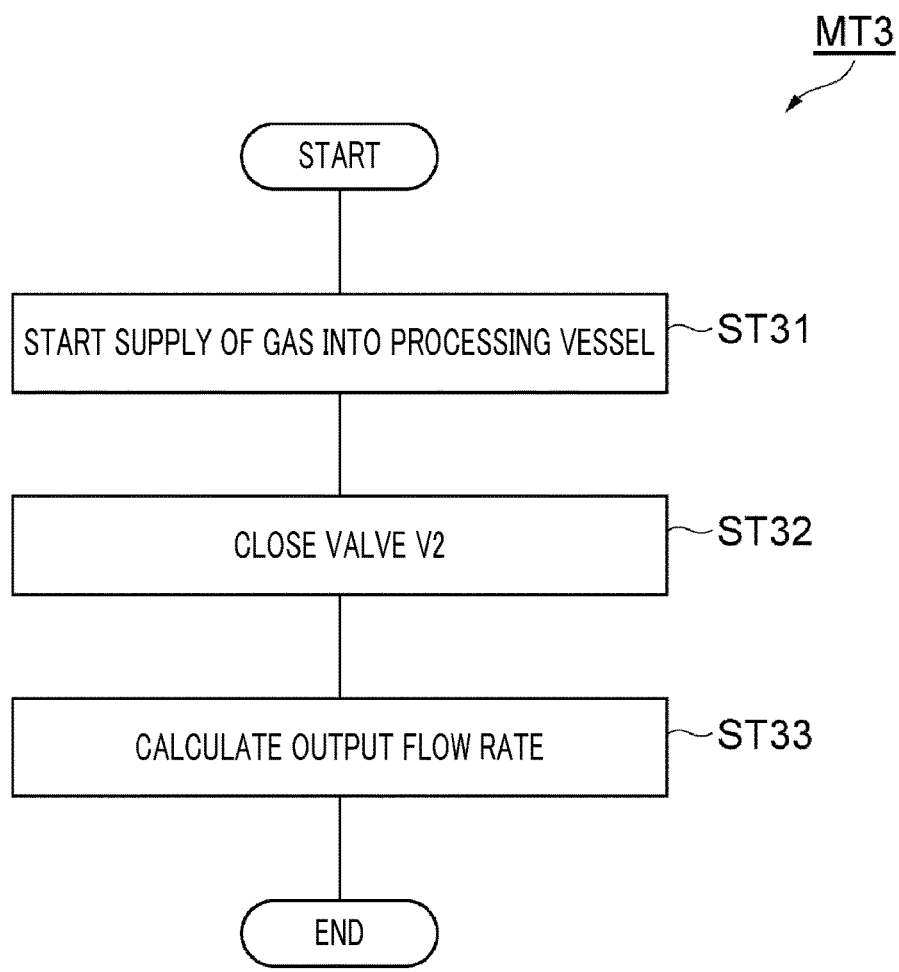
FIG. 6 is a flowchart for describing a method of calculating the output flow rate of the flow rate controller of the gas supply system configured to supply the gas into the processing vessel of the substrate processing apparatus according to still another exemplary embodiment.

Now, a method of calculating the output flow rate of the flow rate controller of the gas supply system configured to supply the gas into the processing vessel of the substrate processing apparatus according to still another exemplary embodiment will be discussed. FIG. 6 is a flowchart for describing this still another exemplary embodiment of the method of calculating the output flow rate of the flow rate controller of the gas supply system configured to supply the gas into the processing vessel of the substrate processing apparatus. The method MT3 shown in FIG. 6 is applicable to the gas supply system GP of FIG. 2. The method MT3 is a modification example of the method MT1.

The method MT3 is begun in a process ST31. The process ST31 is the same as the process ST1. Then, in the method MT3, a process ST32 is performed subsequently. In the process ST32, while continuing the supply of the gas into the processing vessel PC, the pressure measurement value of the pressure gauge P2 of the flow rate controller FC1 is monitored. Then, after the pressure measurement value of the pressure gauge P2 is stabilized, the second valve V2 at the downstream side of the flow rate controller FC1 is closed. If a difference between a minimum value and a maximum value of the pressure measurement value of the pressure gauge P2 for a predetermined time period is equal to or less than a preset value, it may be determined that the pressure measurement value of the pressure gauge P2 is stabilized. In this process ST32, the pressure measurement value may be sent to the control unit Cnt. Further, the monitoring of the pressure measurement value may be performed by the control unit Cnt and the control of the second valve V2 at the downstream side of the flow rate controller FC1 may also be performed by the control unit Cnt.

Figure 7:
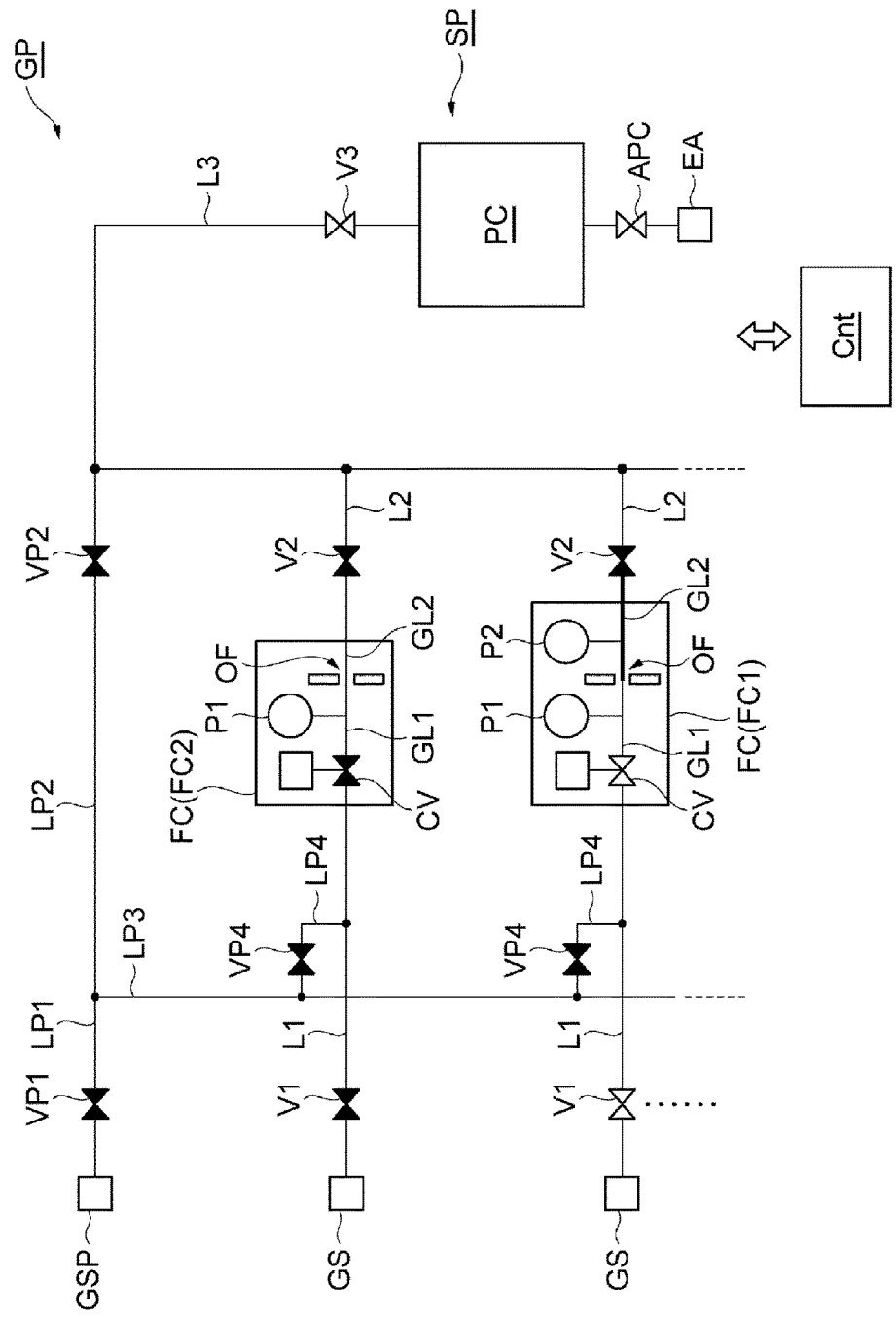
FIG. 7 is a diagram illustrating the valve states of the gas supply system after a process ST32 is performed.

In the process ST32, if the second valve V2 at the downstream side of the flow rate controller FC1 is closed, the individual valves of the gas supply system GP are turned into a state as illustrated in FIG. 7. In FIG. 7, black colored valves indicate closed valves, and white colored valves indicate opened valves.

After the process ST32 is performed, the gas supplied through the flow rate controller FC1 is collected in flow paths indicated by bold lines in FIG. 7. To elaborate, the gas is collected in the gas line GL2 of the flow rate controller FC1 and in a portion of the second line L2 at the downstream side of the gas line GL2 and at the upstream side of the second valve V2. The volume of the flow paths within the gas supply system GP in which the gas is collected after the process ST32 is previously measured before the method MT3 is performed, and thus, is a known volume Vk3.

In a subsequent process ST33, the pressure rise rate (dP/dt) is calculated from pressure measurement values of the pressure gauge P2 at multiple time points after the process ST32 is performed. For example, a gradient of a straight line approximating a relationship between the pressure measurement values and the time points when the pressure measurement values are acquired may be calculated as the pressure rise rate. In the process ST33, the output flow rate Q of the flow rate controller FC1 is calculated by the following Expression (3).

$$Q=(dP/dt) \times Vk3 \div T \times C \quad (3)$$

Further, in Expression (3), T denotes a temperature, and may be an actually measured temperature of the aforementioned flow paths in which the gas is collected, or a preset temperature. Further, C denotes a constant.

In the process ST33, the pressure measurement values of the pressure gauge P2 may be sent to the control unit Cnt, and the calculation of the pressure rise rate and the calculation of the output flow rate Q may also be performed by the control unit Cnt. Further, in case that all the flow rate controllers FC have the same configuration as that of the flow rate controller FC1, the method MT3 may be performed for all of the flow rate controllers FC in turn.

In all of the methods according to the various exemplary embodiments described above, it is possible to calculate the output flow rate of the flow rate controller of the gas supply system by using the pressure measurement value of the pressure gauge of the pressure type flow rate controller previously provided in the gas supply system. Further, the aforementioned known volume is a volume of the flow paths previously provided within the gas supply system GP, and this volume is smaller than the internal volume of the processing vessel PC. Further, the temperature difference within the flow paths is smaller than the temperature difference within the processing vessel PC, and the temperature of the flow paths is stabilized. In all of the methods according to the above-described exemplary embodiments, it is possible to calculate the output flow rate of the flow rate controller with high precision.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

We claim:

1. A method of calculating an output flow rate of a flow rate controller of a gas supply system configured to supply a gas into a processing vessel of a substrate processing apparatus, wherein the gas supply system comprises:
multiple first lines respectively connected to multiple gas sources;
multiple first valves respectively provided at the first lines;
multiple pressure type flow rate controllers respectively provided at downstream sides of the first lines;
multiple second lines respectively provided at downstream sides of the flow rate controllers;
multiple second valves respectively provided at the second lines;
a third line provided at downstream sides of the second lines and connected to the processing vessel of the substrate processing apparatus; and
a third valve provided at the third line, and
wherein the method comprises:
a first process of beginning a supply of a gas, whose flow rate is adjusted by a flow rate controller as a measurement target among the flow rate controllers, into the processing vessel in a state that the third valve is opened;
a second process of closing, while continuing the supply of the gas into the processing vessel, the third valve after a pressure measurement value of a pressure gauge within a flow rate controller for pressure measurement among the flow rate controllers is stabilized; and
a third process of calculating, after the third valve is closed in the second process, the output flow rate of the flow rate controller as the measurement target from a previously known volume of the gas supply system in which the gas supplied through the flow rate controller as the measurement target is collected and a rise rate of the pressure measurement value of the pressure gauge within the flow rate controller for pressure measurement with respect to time.

2. The method of claim 1,
wherein the flow rate controller as the measurement target and the flow rate controller for pressure measurement is one of the flow rate controllers,
the one of the flow rate controllers comprises an orifice, a control valve provided at an upstream side of the orifice, a first pressure gauge configured to measure a pressure of a gas line between the control valve and the orifice, and a second pressure gauge provided at a downstream side of the orifice,
in the first process, only a first valve, among the first valves, provided at an upstream side of the one of the flow rate controllers is opened, and only a second valve, among the second valves, provided at a downstream side of the one of the flow rate controllers is opened,
in the second process, the third valve is closed after a pressure measurement value of the second pressure gauge of the one of the flow rate controllers is stabilized,
in the third process, a rise rate of the pressure measurement value of the second pressure gauge with respect to time is used as the rise rate of the pressure measurement value of the pressure gauge within the flow rate controller for pressure measurement with respect to time.

3. The method of claim 1,
wherein the flow rate controller as the measurement target is a first flow rate controller among the flow rate controllers,
the flow rate controller for pressure measurement is a second flow rate controller, which is different from the first flow rate controller, among the flow rate controllers,
each of the first flow rate controller and the second flow rate controller comprises an orifice, a control valve provided at an upstream side of the orifice and a pressure gauge configured to measure a pressure of a gas line between the control valve and the orifice,
in the first process, only a first valve, among the first valves, provided at an upstream side of the first flow rate controller is opened, and, among the second valves, only a second valve provided at a downstream side of the first flow rate controller and only a second valve provided at a downstream side of the second flow rate controller are opened, and wherein the method further comprises:

an acquiring process of acquiring, after the first process and before the second process, as a first pressure measurement value, a pressure measurement value of the pressure gauge of the second flow rate controller at a moment when the pressure measurement value is stabilized in a state that the supply of the gas into the processing vessel is continued; and a closing process of closing the second valve provided at the downstream side of the first flow rate controller after the second process and before the third process and upon a lapse of a preset time from a time point when the first pressure measurement value is acquired, wherein, in the second process, the third valve is closed immediately after the first pressure measurement value is acquired, and in the third process, the rise rate of the pressure measurement value with respect to time is obtained by dividing a difference between the first pressure measurement value and a second pressure measurement value, which is a pressure measurement value of the pressure gauge of the second flow rate controller at a moment when the pressure measurement value is stabilized, by the preset time.

4. A method of calculating an output flow rate of a flow rate controller of a gas supply system configured to supply a gas into a processing vessel of a substrate processing apparatus, wherein the gas supply system comprises:

multiple first lines respectively connected to multiple gas sources;

multiple first valves respectively provided at the first lines;

multiple pressure type flow rate controllers respectively provided at downstream sides of the first lines;

multiple second lines respectively provided at downstream sides of the flow rate controllers;

multiple second valves respectively provided at the second lines;

a third line provided at downstream sides of the second lines and connected to the processing vessel of the substrate processing apparatus; and a third valve provided at the third line, wherein one of the flow rate controllers comprises an orifice, a control valve provided at an upstream side of the orifice, a first pressure gauge configured to measure a pressure of a gas line between the control valve and the orifice, and a second pressure gauge provided at a downstream side of the orifice, and wherein the method comprises:

a first process of beginning a supply of a gas, whose flow rate is adjusted by the one of the flow rate controllers, into the processing vessel in a state that a first valve, among the first valves, provided at an upstream side of the one of the flow rate controllers, a second valve, among the second valves, provided at a downstream side of the one of the flow rate controllers and the third valve are opened;

a second process of closing, while continuing the supply of the gas into the processing vessel, the second valve provided at the downstream side of the one of the flow rate controllers after a pressure measurement value of the second pressure gauge within the one of the flow rate controllers is stabilized; and a third process of calculating, after the second valve provided at the downstream side of the one of the flow rate controllers is closed in the second process, the output flow rate of the one of the flow rate controllers from a previously known volume of the gas supply system in which the gas supplied through the one of the flow rate controllers is collected and a rise rate of the pressure measurement value of the second pressure gauge of the one of the flow rate controllers with respect to time.

* * * * *

UNITED STATES PATENT AND TRADEMARK OFFICE
CERTIFICATE OF CORRECTION

PATENT NO. : 10,031,007 B2
APPLICATION NO. : 15/262120
DATED : July 24, 2018
INVENTOR(S) : Norihiko Amikura et al.

It is certified that error appears in the above-identified patent and that said Letters Patent is hereby corrected as shown below:

In the Specification

Column 9, Line 56, "Pmt" should be -- Pm2 --.

Signed and Sealed this
Sixth Day of November, 2018

Andrei Iancu
*Director of the United States Patent and Trademark Office*